United States Patent
J S

(10) Patent No.: US 12,289,349 B2
(45) Date of Patent: Apr. 29, 2025

(54) NETWORK TRAFFIC MONITORING BASED ON CONTENT DATA

(71) Applicant: Juniper Networks, Inc., Sunnyvale, CA (US)

(72) Inventor: Sheeja J S, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 18/500,351

(22) Filed: Nov. 2, 2023

(65) Prior Publication Data

US 2024/0073112 A1 Feb. 29, 2024

Related U.S. Application Data

(63) Continuation of application No. 16/915,285, filed on Jun. 29, 2020, now Pat. No. 11,811,627.

(51) Int. Cl.
| | |
|---|---|
| *H04L 9/40* | (2022.01) |
| *H04L 43/026* | (2022.01) |
| *H04L 43/028* | (2022.01) |
| *H04L 43/12* | (2022.01) |
| *H04L 41/12* | (2022.01) |
| *H04L 41/22* | (2022.01) |

(52) U.S. Cl.
CPC .......... *H04L 63/306* (2013.01); *H04L 43/026* (2013.01); *H04L 43/028* (2013.01); *H04L 43/12* (2013.01); *H04L 63/08* (2013.01); *H04L 63/102* (2013.01); *H04L 41/12* (2013.01)

(58) Field of Classification Search
CPC ..... H04L 43/028; H04L 43/026; H04L 43/12; H04L 63/08; H04L 63/102; H04L 63/306; H04L 41/12; H04L 41/22
See application file for complete search history.

(56) References Cited

U.S. PATENT DOCUMENTS

| | | | |
|---|---|---|---|
| 7,251,215 B1 | 7/2007 | Turner et al. | |
| 7,633,944 B1 | 12/2009 | Chang et al. | |
| 7,747,737 B1 | 6/2010 | Apte et al. | |
| 7,809,827 B1 * | 10/2010 | Apte | H04L 43/028 |
| | | | 709/224 |
| 8,537,818 B1 * | 9/2013 | Thesayi | H04L 45/00 |
| | | | 709/227 |
| 8,605,629 B1 | 12/2013 | S et al. | |
| 9,444,683 B2 | 9/2016 | Kakadia et al. | |

(Continued)

*Primary Examiner* — Kamal M Hossain
(74) *Attorney, Agent, or Firm* — Harrity & Harrity, LLP

(57) ABSTRACT

A network monitoring device may receive, from a mediation device, flow-tap content data (generated by the mediation device based on current and/or previous investigation reports associated with flow tapping) that needs to be monitored. The network monitoring device may map the content data to a flow-tap content destination address of a content destination device in an entry of a flow-tap content filter. The network monitoring device may analyze, using the flow-tap content filter, network traffic of the network to detect a traffic flow that includes the content data. The network monitoring device may generate, based on successfully detecting a traffic flow that includes the content data, a traffic flow copy and may provide the traffic flow copy to the flow-tap content destination address, wherein the traffic flow copy is to be accessible to the content destination device to enable a context analysis of the content data.

20 Claims, 10 Drawing Sheets

(56) References Cited

U.S. PATENT DOCUMENTS

| | | |
|---|---|---|
| 9,736,051 B2 | 8/2017 | Nachum |
| 9,877,210 B1 * | 1/2018 | Hildner et al. |
| 10,187,400 B1 * | 1/2019 | Castro ................. H04L 63/1408 |
| 11,115,346 B2 | 9/2021 | Stolarchuk et al. |
| 11,811,627 B2 * | 11/2023 | J S .......................... H04L 43/12 |
| 2006/0059163 A1 | 3/2006 | Frattura et al. |
| 2006/0179141 A1 | 8/2006 | John et al. |
| 2007/0157306 A1 | 7/2007 | Elrod et al. |
| 2010/0199189 A1 | 8/2010 | Ben-Aroya et al. |
| 2011/0179479 A1 | 7/2011 | Tsai et al. |
| 2011/0258702 A1 | 10/2011 | Olney et al. |
| 2012/0096145 A1 | 4/2012 | Le et al. |
| 2013/0188635 A1 | 7/2013 | Park et al. |
| 2014/0269269 A1 | 9/2014 | Kovvali et al. |
| 2014/0321278 A1 | 10/2014 | Cafarelli et al. |
| 2016/0142304 A1 | 5/2016 | Alawani et al. |
| 2017/0063786 A1 | 3/2017 | Pettit et al. |
| 2017/0187587 A1 | 6/2017 | Keppel et al. |
| 2017/0237645 A1 | 8/2017 | Shanbhag et al. |
| 2019/0149518 A1 | 5/2019 | Sevinc et al. |
| 2019/0303385 A1 | 10/2019 | Ching et al. |
| 2020/0137024 A1 | 4/2020 | Janakiraman |
| 2020/0137115 A1 | 4/2020 | Janakiraman et al. |
| 2021/0076260 A1 * | 3/2021 | Albasheir ............. H04W 12/80 |
| 2021/0226887 A1 | 7/2021 | Mereddy |
| 2022/0103525 A1 | 3/2022 | Shribman et al. |

\* cited by examiner

NETWORK TRAFFIC MONITORING BASED ON CONTENT DATA

CROSS-REFERENCE TO RELATED APPLICATION

This application is a continuation of U.S. patent application Ser. No. 16/915,285, filed Jun. 29, 2020 (now U.S. Pat. No. 11,811,627), which claims priority to India Patent Application No. 202041019580, entitled "NETWORK TRAFFIC MONITORING BASED ON CONTENT DATA," filed on May 8, 2020. The entire contents of the above-referenced applications are expressly incorporated herein by reference.

BACKGROUND

Lawful interception includes obtaining network traffic from a network device pursuant to a lawful authority for the purpose of analysis and/or evidence. Such traffic may include signaling or network management information or content of communications.

SUMMARY

According to some implementations, a method may include receiving, by a network device of a network, flow-tap content information that identifies content data that is to be monitored by a content destination device; mapping, by the network device, the content data to a flow-tap content destination address of the content destination device in an entry of a flow-tap content filter, wherein the flow-tap content filter is maintained within a data structure of the network device; analyzing, by the network device and using the flow-tap content filter, network traffic of the network to detect a traffic flow that includes the content data; generating, by the network device and based on detecting the traffic flow in the network traffic, a traffic flow copy that is associated with the traffic flow; and providing, by the network device and based on the flow-tap content destination address, the traffic flow copy to the flow-tap content destination address, wherein the traffic flow copy is to be accessible to the content destination to enable a context analysis of the content data.

According to some implementations, a network device may include one or more memories and one or more processors to: receive, from a mediation device, flow-tap content information, wherein the flow-tap content information identifies content data that is to be monitored by a content destination device; monitor, using a flow-tap content filter, network traffic of a network to identify a traffic flow that includes the content data, wherein the flow-tap content filter includes an entry that identifies the content data and the content destination device; process, based on identifying the traffic flow within the network traffic, the traffic flow for a transmission of the traffic flow to a traffic flow destination of the traffic flow; generate, based on processing the traffic flow, a traffic flow copy of the traffic flow; provide, based on the entry, the traffic flow copy of the traffic flow to the content destination device; and transmit the traffic flow to the traffic flow destination.

According to some implementations, a non-transitory computer-readable medium may store one or more instructions. The one or more instructions, when executed by one or more processors of a network device, may cause the one or more processors to: monitor, using a flow-tap content filter, network traffic of a network to identify a traffic flow that includes content data, wherein the flow-tap content filter includes a plurality of sets of content data that are to be monitored by a content destination device; process, based on the flow-tap content filter including an entry associated with the content data, the traffic flow for a transmission of the traffic flow to a traffic flow destination; generate, based on processing the traffic flow, a traffic flow copy of the traffic flow; and provide, based on the entry mapping the content data to a flow-tap content destination address, the traffic flow copy to the content destination device, wherein the flow-tap content destination address is associated with the content destination device.

DETAILED DESCRIPTION

Figure 1A:
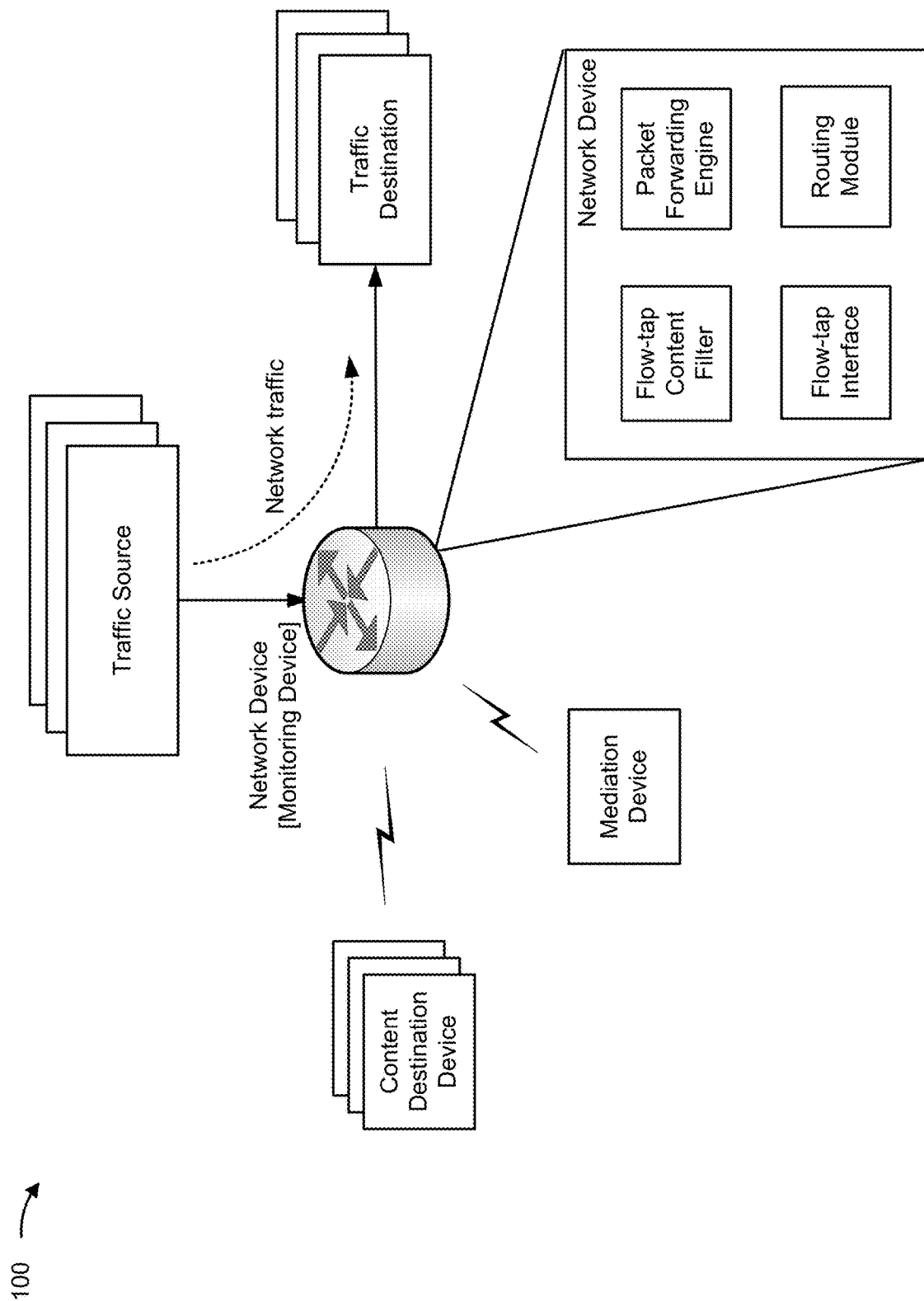
FIGS. 1A-1D are diagrams of an example implementation described herein.

The following detailed description of example implementations refers to the accompanying drawings. The same reference numbers in different drawings may identify the same or similar elements.

Lawful interception (LI) is a process for obtaining network traffic related to an individual (a target), as authorized by a judicial or administrative order, and providing the network traffic to a law enforcement agency (LEA) (e.g., a police department, a government agency, and/or the like). The network traffic may be lawfully intercepted at a network device (e.g., a router, a firewall, and/or the like) via flow tapping. To perform flow tapping, the network device copies or minors the network traffic that passes through the network device, forwards the original network traffic to an intended destination, and forwards the copied network traffic to a content destination device (e.g., associated with the LEA) that analyzes the copied network traffic. Network devices are only capable of tapping network traffic (e.g., packets) based on a specific set of defined parameters, such as a source Internet protocol (IP) address, a destination IP address, a source port, a destination port, and/or the like.

However, this may cause the network device to copy all network traffic from a particular traffic source (e.g., associated with a target) and/or to a particular traffic destination (e.g., associated with the target or another target), even when the network traffic does not include content associated with fraudulent activity, dangerous activity (e.g., terrorist activity, organized crime activity, and/or the like), and/or the like. Accordingly, the network device may consume computing resources (e.g., processing resources, memory resources, power resources, and/or the like) to copy network traffic that is likely not of interest to the LEA. Moreover, the content destination device may consume computing resources (e.g., processing resources, memory resources, power resources, and/or the like) to analyze the copied network traffic to determine that the network traffic does not include content associated with fraudulent activity, dangerous activity, and/ or the like.

Some implementations described herein provide a network device (e.g., a monitoring device) that is able to identify particular keywords, particular key phrases, particular word patterns, and/or the like in the content of network traffic to trigger a flow tapping process. In some implementations, a mediation device (e.g., an authorized user device) may send flow-tap content information (e.g., that indicates content data that is to trigger the flow tapping process) to the network device, which may generate an entry in a flow-tap content filter associated with the flow-tap content information. The network device may analyze and/or monitor network traffic using the flow-tap content filter to identify a packet that includes content that corresponds to content data of an entry in the flow-tap content filter. The network device may therefore perform a flow tapping process for a traffic flow associated with the packet to send a traffic flow copy to a content destination device (e.g., an authorized tapping device) associated with an LEA (e.g., for the authorized tapping device to analyze the traffic flow copy).

In this way, the network device may perform a flow tapping process for only network traffic that is associated with one or more packets that include keywords, key phrases, word patterns, and/or the like that are associated with fraudulent activity, dangerous activity, and/or the like. This may conserve computing resources (e.g., processing resources, memory resources, power resources, and/or the like) of the network device that would otherwise be used to perform a flow tapping process for all network traffic associated with target traffic sources and/or target traffic destinations routed by the network device. This may also conserve computing resources (e.g., processing resources, memory resources, power resources, and/or the like) of the content destination device by allowing the content destination device to analyze only traffic flow copies that include keywords, key phrases, word patterns, and/or the like that are associated with fraudulent activity, dangerous activity, and/or the like, rather than analyzing traffic flow copies associated with all network traffic between target traffic sources and/or traffic destinations routed by the network device.

FIGS. 1A-1D are diagrams of one or more examples 100 associated with network traffic monitoring or storage based on content data. As shown in FIGS. 1A-1D, example(s) 100 includes a mediation device (e.g., an authorized user device), one or more content destination devices (also referred to as authorized tapping devices), one or more traffic sources (e.g., one or more origination endpoint devices), one or more traffic destinations (e.g., one or more destination endpoint devices), and/or a network device (also referred to as a monitoring device, a network monitoring device, and/or the like). As shown in FIG. 1A, the one or more traffic sources may transmit network traffic (e.g., Internet protocol (IP) version 4 (IPv4) traffic, IP version 6 (IPv6 traffic), and/or the like) to the one or more traffic destinations via the network device (e.g., a router, a switch, and/or the like). A mediation device may be a user device, a client device, and/or the like of an LEA or other authorized organization for providing flow-tap information to identify content data of the network traffic that is transmitted between the one or more traffic sources and the one or more traffic destinations. A content destination device may be a user device, a client device, and/or the like of the LEA, or the other authorized organization, that is to monitor, analyze, and/or the like, the content data. As shown in FIG. 1A, the network device may include a flow-tap content filter, a packet forwarding engine, a flow-tap interface, a routing module, and/or the like (e.g., each stored and/or maintained within respective data structures of the network device).

Figure 1B:
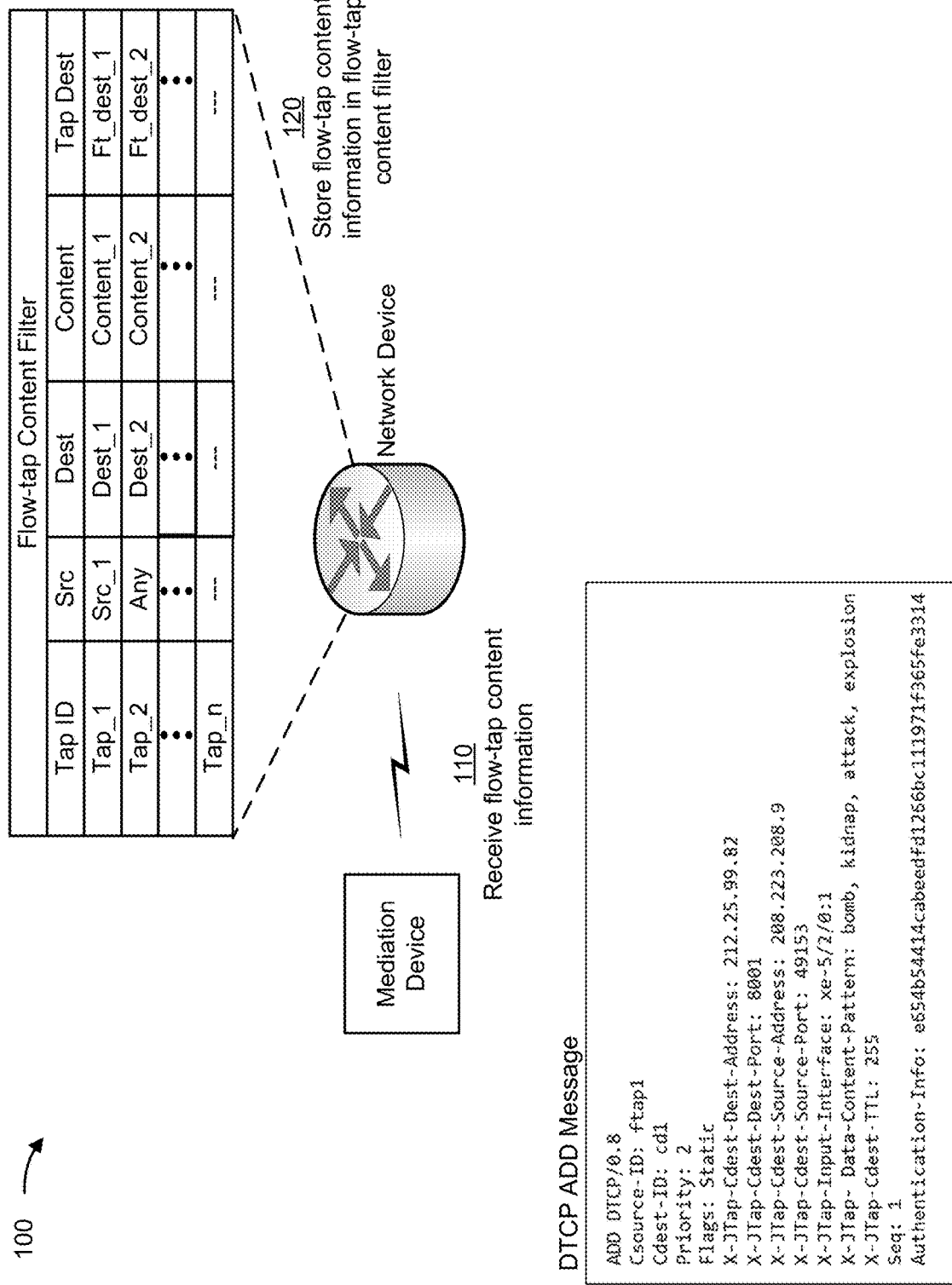

As shown in FIG. 1B and by reference number 110, the network device may receive flow-tap content information from the mediation device. For example, a user (e.g., an LEA representative) may interact with a user interface of the mediation device to cause the mediation device to generate and send the flow-tap content information to the network device. The flow-tap content information may identify content data (e.g., that is to be monitored and/or analyzed by the network device), source information (e.g., an address, a port, and/or the like associated with at least one traffic source that is to provide the content data), destination information (e.g., an address, a port, and/or the like associated with at least one traffic destination that is to receive the content data), flow-tap destination information (e.g., an address, a port, and/or the like of a content destination device of the one or more content destination devices), and/or the like. The content data may be associated with a set of keywords, a set of key phrases, a set of word patterns, and/or the like (e.g., that are configured to trigger a flow tapping process by the network device, as described herein). In some implementations, the mediation device may generate the content data based on current and/or previous investigation reports associated with flow tapping.

As an example, the flow-tap content information may be included in a dynamic tasking control protocol (DTCP) message (e.g., a DTCP ADD message). As shown in FIG. 1B, a DTCP ADD message may include a destination address field (shown as X-JTap-Cdest-Dest-Address) that indicates an address (shown as 212.25.99.82) of a traffic destination that is to be monitored; a destination port field (shown as X-JTap-Cdest-Dest-Port) that indicates a port (shown as 8001) of the traffic destination that is to be monitored; a source address field (shown as X-JTap-Cdest-Source-Address) that indicates an address (shown as 208.223.208.9) of a traffic source that is to be monitored; a source port field (shown as X-JTap-Cdest-Source-Port) that indicates a port (shown as 49153) of the traffic source that is to be monitored; a data content field (X-JTap-Data-Content-Pattern) that indicates a set of keywords (shown as bomb, kidnap, attack, and explosion) that are configured to trigger a flow tapping process by the network device; a flow-tap destination field (Cdest-ID) that identifies a content destination tapping device (shown as cd1). Accordingly, the DTCP ADD message may indicate that the network device is to monitor network traffic between the address and the port of the traffic source and the address and the port of the traffic destination for content that matches or corresponds to the set of keywords, and to send relevant content to the content destination device.

In some implementations, the network device may perform an authentication process to determine whether the mediation device is an authorized device (e.g., whether the mediation device is authorized to provide flow-tap content information). For example, the mediation device may send credentials of the mediation device to the network device (e.g., with the flow-tap content information or as a separate data transmission). The network device may verify, based on the credentials, that the mediation device is an authorized device. Additionally, or alternatively, the network device may send the credentials to a server device (e.g., an authentication server device) that processes the credentials to determine whether the credentials are accepted or rejected. Accordingly, the network device may receive, from the server device, an authentication acceptance message (e.g., indicating that the credentials are accepted) or an authentication rejection message (e.g., indicating that the credentials are rejected). The network device may therefore determine, based on receiving an authentication acceptance message, that the mediation device is an authorized device or determine, based on receiving an authentication rejection messages, that the mediation device is not an authorized device.

In some implementations, when the network device determines that the mediation device is not an authorized device, the network device may discard the flow-tap content information. In some implementations, when the network device determines that the mediation device is an authorized device, the network device may store the flow-tap content information and/or analyze network traffic based on the flow-tap content information, as described herein.

As shown by reference number 120, the network device may store some or all of the flow-tap content information in the flow-tap content filter. For example, the network device may generate, based on the flow-tap content information, an entry (e.g., a flow-tap entry associated with the flow-tap content information) in the flow-tap content filter. As shown in FIG. 1B, the entry may include an entry identifier (shown as Tap ID), a source field (shown as Src), a destination field (shown as Dest), a content field (shown as Content), and a flow-tap destination field (shown in FIG. 1B as Tap Dest).

The network device may cause the source field of the entry to include some or all of the source information of the flow-tap content information. The network device may cause, when source information is not included in the flow-tap content information, the source field to include an "Any" designation that indicates that the entry applies to network traffic originating from any traffic source. In some implementations, the network device may cause the destination field of the entry to include some or all of the destination information of the flow-tap content information. The network device may cause, when destination information is not included in the flow-tap content information, the destination field to include an "Any" designation that indicates that the entry applies to network traffic destined for any traffic destination.

In some implementations, the network device may cause the content field of the entry to include some or all of the content data included in the flow-tap content information. For example, the network device may cause the content field to include the set of keywords, the set of key phrases, the set of word patterns, and/or the like of the content data. In some implementations, the network device may cause the flow-tap destination field of the entry to include some or all of the flow-tap destination information included in the flow-tap content information. The network device may cause, when flow-tap destination information is not included in the flow-tap content information, the flow-tap destination field to include an address, port, and/or the like of a default content destination device. In this way, the network device may map the content data of the flow-tap content information to a flow-tap content destination address in an entry of the flow-tap content filter.

As shown in FIG. 1B, the flow-tap content filter may include one or more entries (shown with Tap_IDs Tapi to Tap_n, where n is greater than or equal to 1). For example, a first entry (shown as Tap_1) includes a source field that indicates a "Src_1" traffic source, a destination field that indicates a "Dest_1" traffic destination, a content field that indicates "Content_1" content, and a tap destination field that indicates a "Ft_dest_1" content destination device. As another example, a second entry (shown as Tap_2) includes a source field that indicates "Any" traffic source (e.g., indicating that the entry applies to network traffic originating from any traffic source), a destination field that indicates a "Dest_2" traffic destination, a content field that indicates "Content_2" content, and a tap destination field that indicates a "Ft_dest_2" content destination device.

Figure 1C:
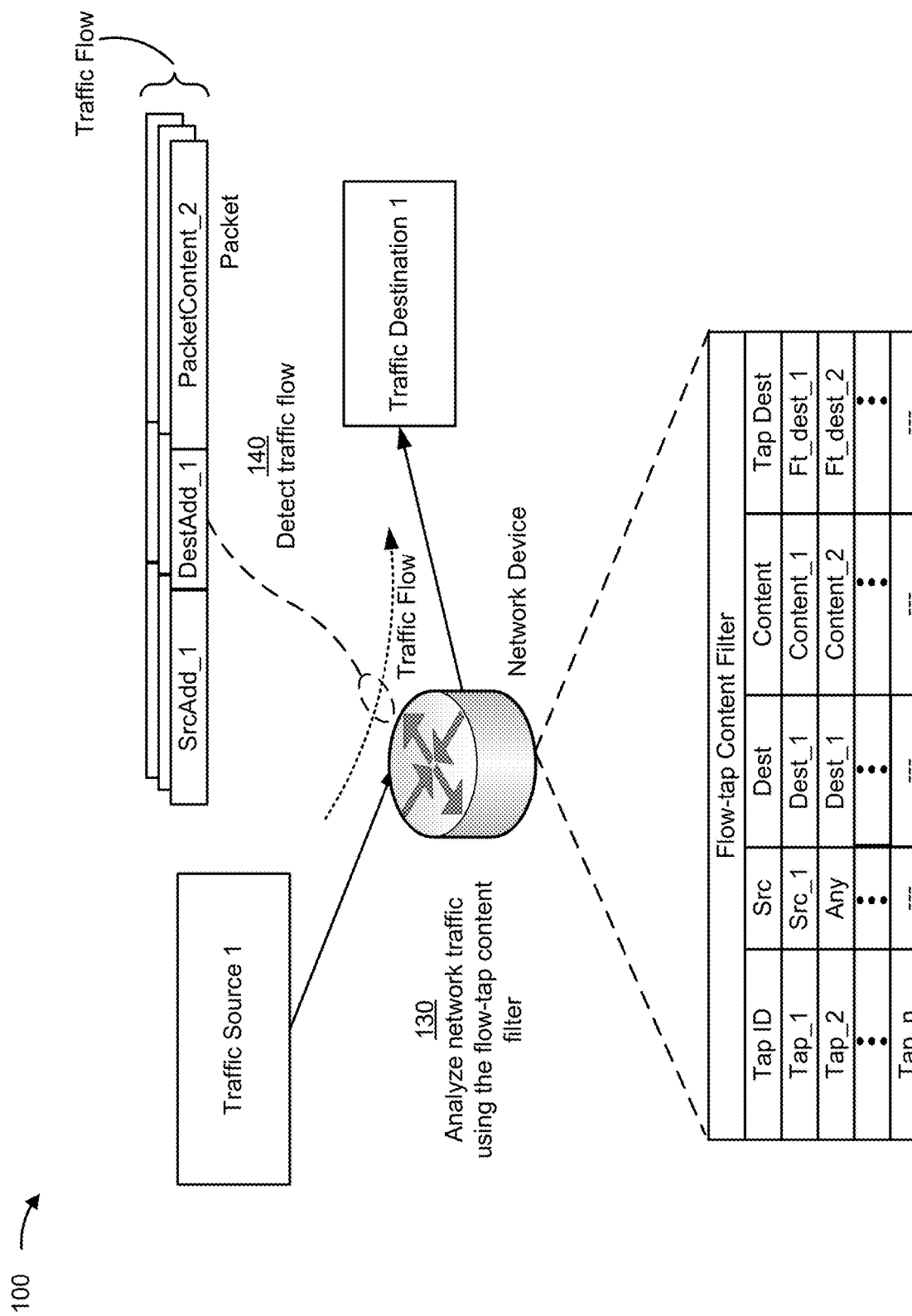

In some implementations, the network device may receive, from the one or more traffic sources, network traffic destined for the one or more traffic destinations. As shown in FIG. 1C and by reference number 130, the network device may monitor and/or analyze the network traffic using the flow-tap content filter. For example, the network device may analyze a packet of the network traffic, which, as shown in FIG. 1C, may include information indicating a source address "SrcAdd_1" (e.g., in a source field of the packet), a destination address "DestAdd_1" (e.g., in a destination field of the packet), and/or packet content "PacketContent_2" (e.g., in a payload field of the packet).

In some implementations, the network device may determine (e.g., using deep packet inspection (DPI)) whether the packet matches or corresponds to an entry in the flow-tap content filter. The network device may perform a lookup operation that involves scanning the flow-tap content filter for an entry that matches or corresponds to the packet. For example, the network device may compare (e.g., using DPI) one or more fields of the packet and one or more respective fields of the one or more entries of the flow-tap content filter. The network device may identify an entry that indicates a same or similar source address as the packet, a same or similar destination address as the packet, and/or same or similar content of the packet. For example, as shown in FIG. 1C, a second entry (shown as Tap_2) of a flow-tap content filter includes: a source field that indicates "Any" traffic source that corresponds to the "SrcAdd_1" traffic source indicated by the source field of the packet; a destination field that indicates a "Dest_1" traffic destination that is the same as or similar to the "DestAdd_1" traffic destination indicated by the destination field of the packet; and a content field that indicates "Content_2" that is the same as or is similar to "PacketContent_2" content indicated by the content field of the packet (e.g., a set of keywords, a set of key phrases, a set of word patterns, and/or the like of the content field correspond to or match content of the content field of the packet).

In some implementations, the network device may identify, based on the source address field and the destination address field of the packet, a particular traffic source (shown in FIG. 1C as traffic source 1) and a particular traffic destination (shown in FIG. 1C as traffic destination 1) associated with the packet. As shown by reference number 140, the network device may detect (e.g., based on determining that the packet matches or corresponds to an entry in the flow-tap content filter) a traffic flow that includes the packet and/or one or more additional packets of the network traffic that are transmitted from the particular traffic source to the particular second traffic source. For example, the traffic flow may include a particular number of packets transmitted from the particular traffic sources to the particular traffic destination after the network device determines that the packet matches or corresponds to an entry in the flow-tap content filter (e.g., the next 100 additional packets; the next 1,000 additional packets; the next 10,000 additional packets; and/or the like after the packet). As another example, the traffic flow may include any number of packets transmitted, from the particular traffic source to the particular traffic destination, during a time period after the network device determines that the packet matches or corresponds to an entry in the flow-tap content filter (e.g., for 1 second, 10 seconds, 20 seconds, and/or the like after the network device determines that the packet matches or corresponds to an entry in the flow-tap content filter).

In some implementations, the network device may notify, based on determining that the packet matches or corresponds to an entry in the flow-tap content filter and/or detecting the traffic flow, the content destination device that the packet and/or the traffic flow was identified. For example, the transmitting network device may send, to the flow-tap content destination address (e.g., of the content destination device and/or one or more other content destination devices) indicated by the entry in the flow-tap content filter, a message indicating that a packet and/or traffic flow matches or corresponds to the entry. In some implementations, the network device may receive, from the content destination device (or another content destination device), a response indicating that the network device is to perform a flow tapping process on the traffic flow (e.g., provide a traffic flow copy to the content destination device). The network device therefore may process the traffic flow as described herein in relation to FIG. 1D. Additionally, or alternatively, the network device may receive, from the content destination device (or another content destination device), a response indicating that the network device is to not perform a flow tapping process on the traffic flow. The network device may therefore route the traffic flow using a typical routing process.

Figure 1D:
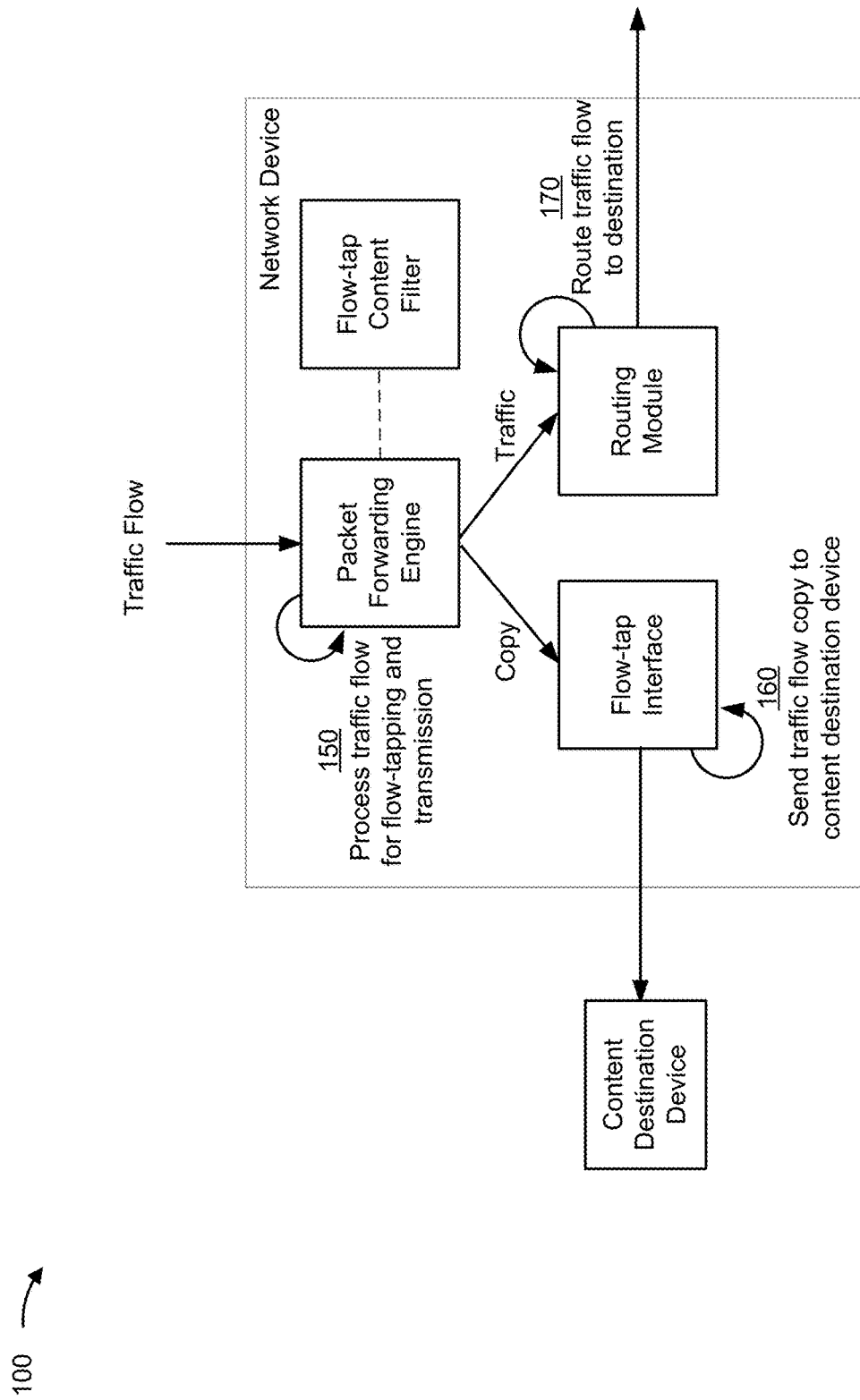

As shown in FIG. 1D and by reference number 150, the network device (e.g., using the packet forwarding engine of the network device) may process the traffic flow. In some implementations, the network device may process the traffic flow to generate a traffic flow copy that corresponds to the traffic flow. For example, the network device may duplicate each packet of the traffic flow to generate the traffic flow copy. The network device, based on the entry of the flow-tap content filter associated with the traffic flow, may include the flow-tap content destination address (e.g., of the content destination device and/or one or more other content destination devices) indicated by the entry in the traffic flow copy (e.g., the network device may encapsulate each packet of the traffic flow copy with the flow-tap content destination address). As another example, the network device may extract payload data of the traffic flow (e.g., from the respective payload fields of the packets that comprise the traffic flow) and generate new packets that include the extracted payload data to generate the traffic flow copy. Each new packet of the traffic flow copy may include the flow-tap content destination address (e.g., of the content destination device and/or one or more other content destination devices) indicated by the entry.

Additionally, or alternatively, the network device may process the traffic flow to transmit the traffic flow to the traffic destination associated with the traffic flow (e.g., as if the network device did not perform a flow tapping process). For example, the network device may generate routing data indicating that the network device received the traffic flow and/or is to route the traffic flow to the traffic destination associated with the traffic flow. The network device may include the routing data in each packet of the traffic flow (e.g., the network device may encapsulate each packet of the traffic flow with the routing data).

As shown by reference number 160, the network device (e.g., using the flow-tap interface of the network device) may send the traffic flow copy to the content destination device. For example, the network device may send the traffic flow copy to the flow-tap content destination address (e.g., of the content destination device and/or one or more other content destination devices) included in the packets of the traffic flow copy. Additionally, or alternatively, the network device may identify a communication protocol (e.g., an IP protocol, a DTCP protocol, and/or the like) of the content destination device (e.g., for receiving a traffic flow copy) and may configure the traffic flow copy based on the communication protocol. The network device may therefore send the traffic flow copy to the content destination device according to the communication protocol of the content destination device. In some implementations, the network device may send the traffic flow copy to the content destination device via a secure tunnel, such as an IP security (IPsec) tunnel.

In some implementations, the content destination device may process the traffic flow copy to determine a context analysis (e.g., determine whether the traffic flow copy is associated with fraudulent activity, dangerous activity, and/or the like). The content destination device may extract payload data of the traffic flow copy (e.g., from respective payload fields of the packets that comprise the traffic flow copy) and analyze the payload data (e.g., using natural language processing) to determine whether the traffic flow is associated with fraudulent activity, dangerous activity, and/or the like.

As shown by reference number 170, the network device (e.g., using the routing module of the network device) may route the traffic flow to the traffic destination associated with the traffic flow. The network device may route the traffic flow to the traffic destination without any indication to the traffic destination that a flow-tapping process occurred (e.g., without notifying the traffic flow destination that the traffic flow copy was generated).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
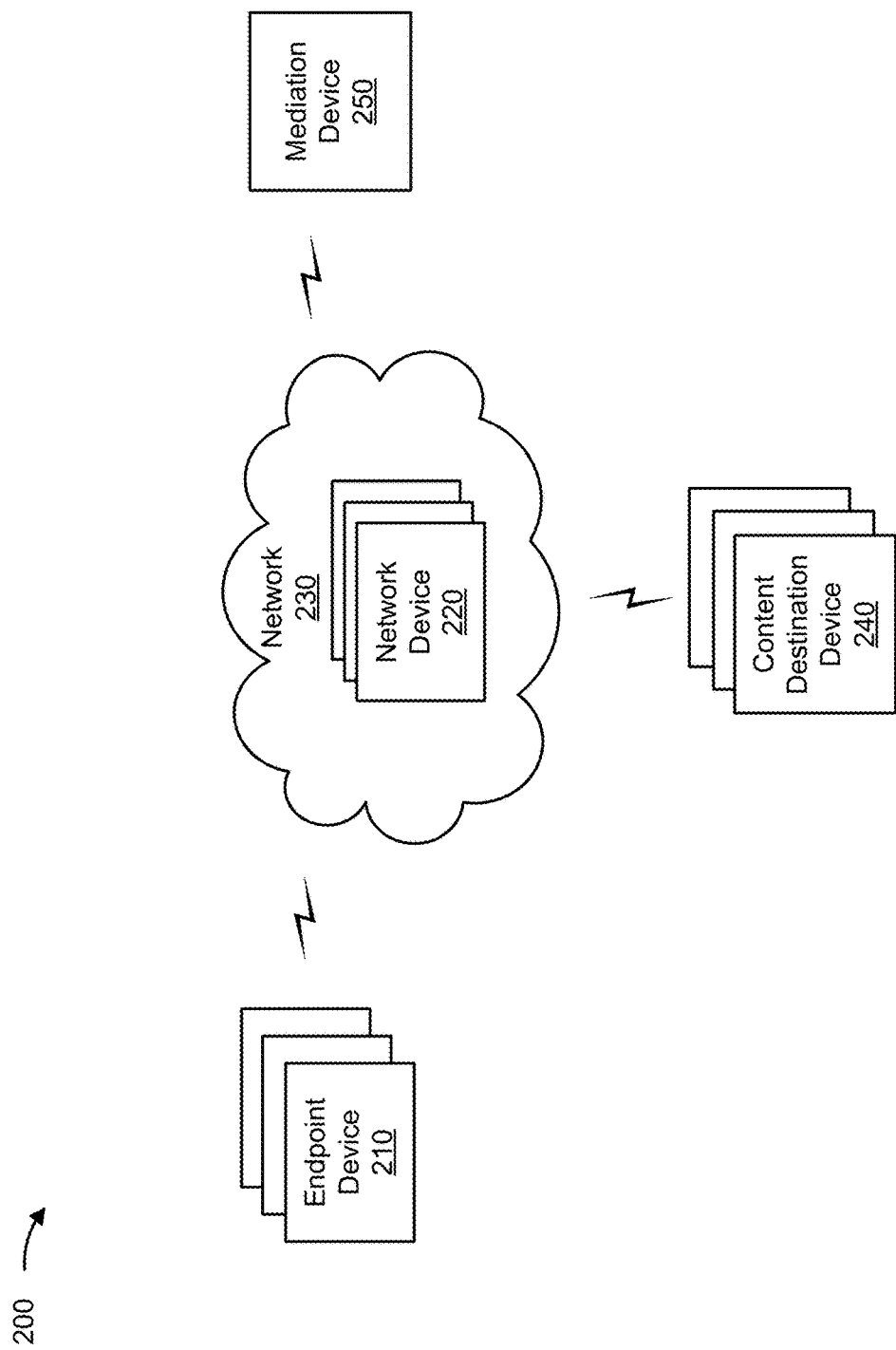
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more endpoint devices 210, one or more network devices 220, a network 230, one or more content destination devices 240, and a mediation device 250. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Content destination device 240 includes one or more devices capable of receiving, generating, storing, processing, and/or providing information, such as information described herein. Content destination device 240 may include a communication device and/or a computing device. For example, content destination device 240 may include a wireless communication device, a user equipment (UE), a mobile phone (e.g., a smart phone or a cell phone, among other examples), a laptop computer, a tablet computer, a handheld computer, a desktop computer, or a similar type of device. Content destination device 240 may be associated with one or more law enforcement authorities (e.g., police departments, government agencies, and/or the like) and may be utilized by the law enforcement authorities to receive particular network traffic of network 230 that is to be monitored for the purpose of analysis and/or evidence. Content destination device 240 may communicate with one or more other devices of environment 2, as described elsewhere herein.

Mediation device 250 includes one or more devices capable of receiving, generating, storing, processing, and/or providing information, such as information described herein. Mediation device 250 may include a communication device and/or a computing device. For example, mediation device 250 may include a wireless communication device, a UE, a mobile phone (e.g., a smart phone or a cell phone, among other examples), a laptop computer, a tablet computer, a handheld computer, a desktop computer, or a similar type of device. Mediation device 250 may be associated with one or more law enforcement authorities (e.g., police departments, government agencies, and/or the like) and may be utilized by the law enforcement authorities to specify particular network traffic of network 230 that is to be monitored for the purpose of analysis and/or evidence. Mediation device 250 may communicate with one or more other devices of environment 2, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
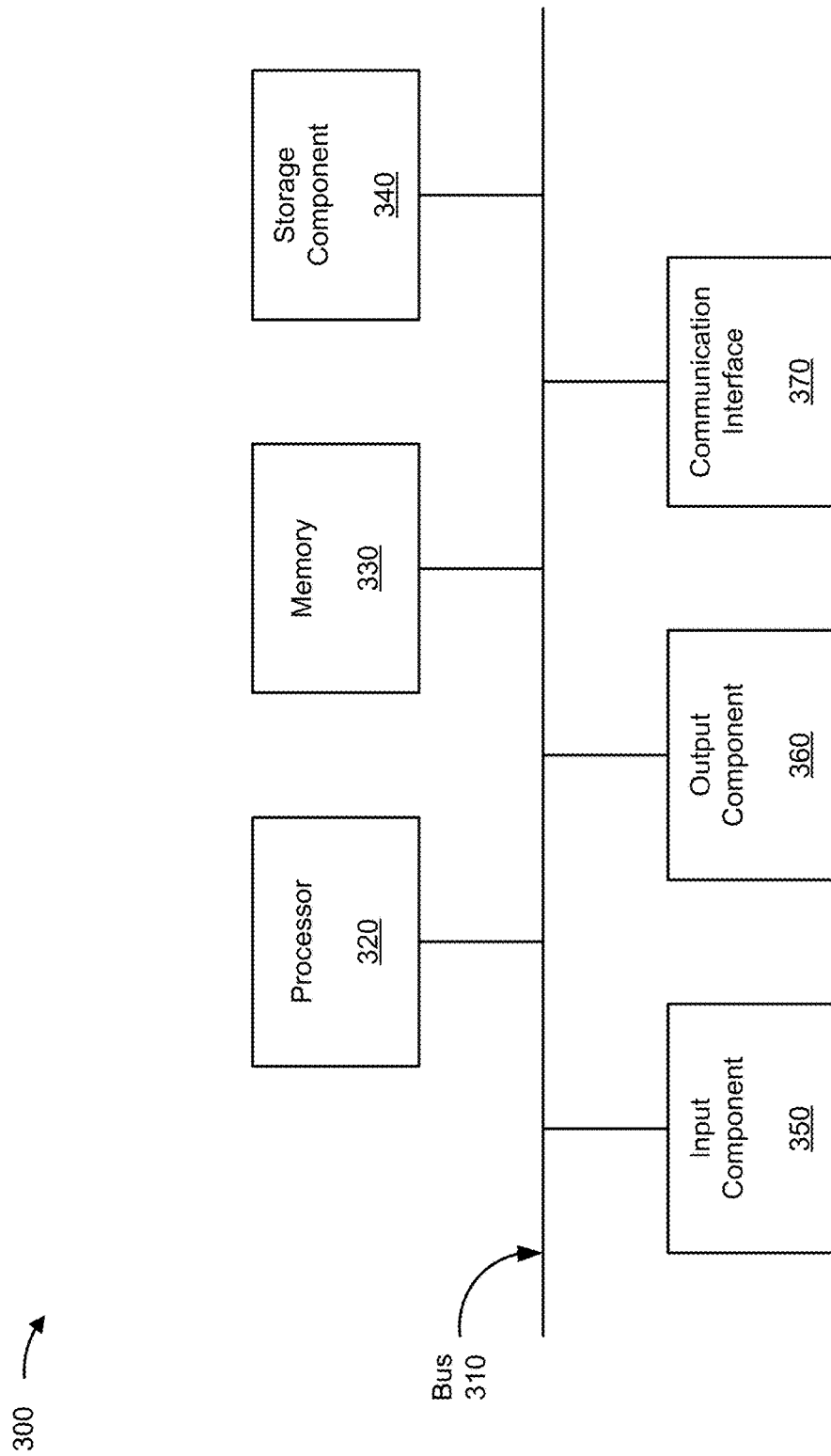
FIGS. 3-4 are diagrams of example components of one or more devices of FIG. 2.

FIG. 3 is a diagram of example components of a device 300. Device 300 may correspond to endpoint device 210, network device 220, content destination device 240, and/or mediation device 250. In some implementations, endpoint device 210, network device 220, content destination device 240, and/or mediation device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, an RF interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
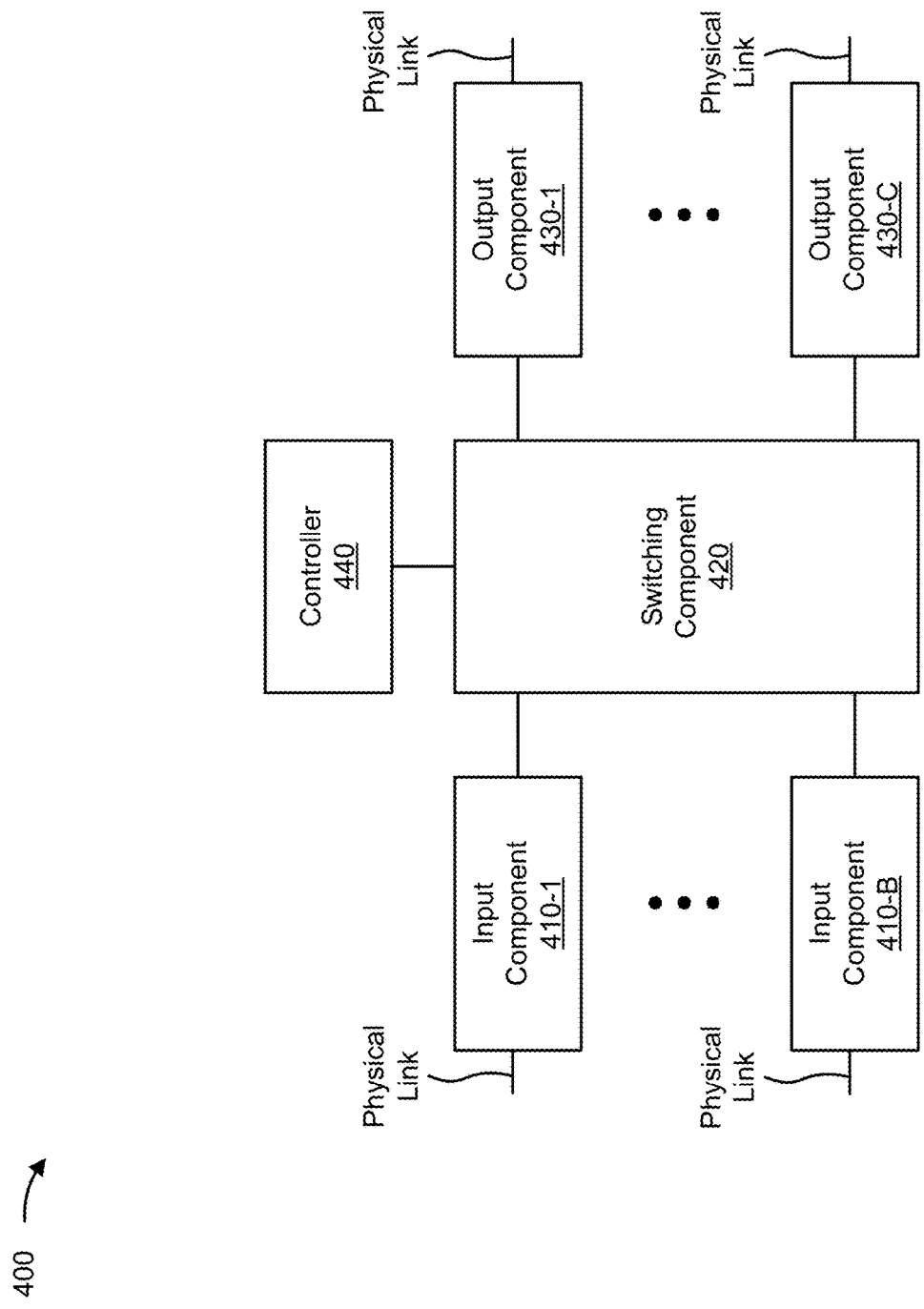

FIG. 4 is a diagram of example components of a device 400. Device 400 may correspond to endpoint device 210, network device 220, content destination device 240, and/or mediation device 250. In some implementations, endpoint device 210, network device 220, content destination device 240, and/or mediation device 250 may include one or more devices 400 and/or one or more components of device 400. As shown in FIG. 4, device 400 may include one or more input components 410-1 through 410-B (B>1) (hereinafter referred to collectively as input components 410, and individually as input component 410), a switching component 420, one or more output components 430-1 through 430-C (C>1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
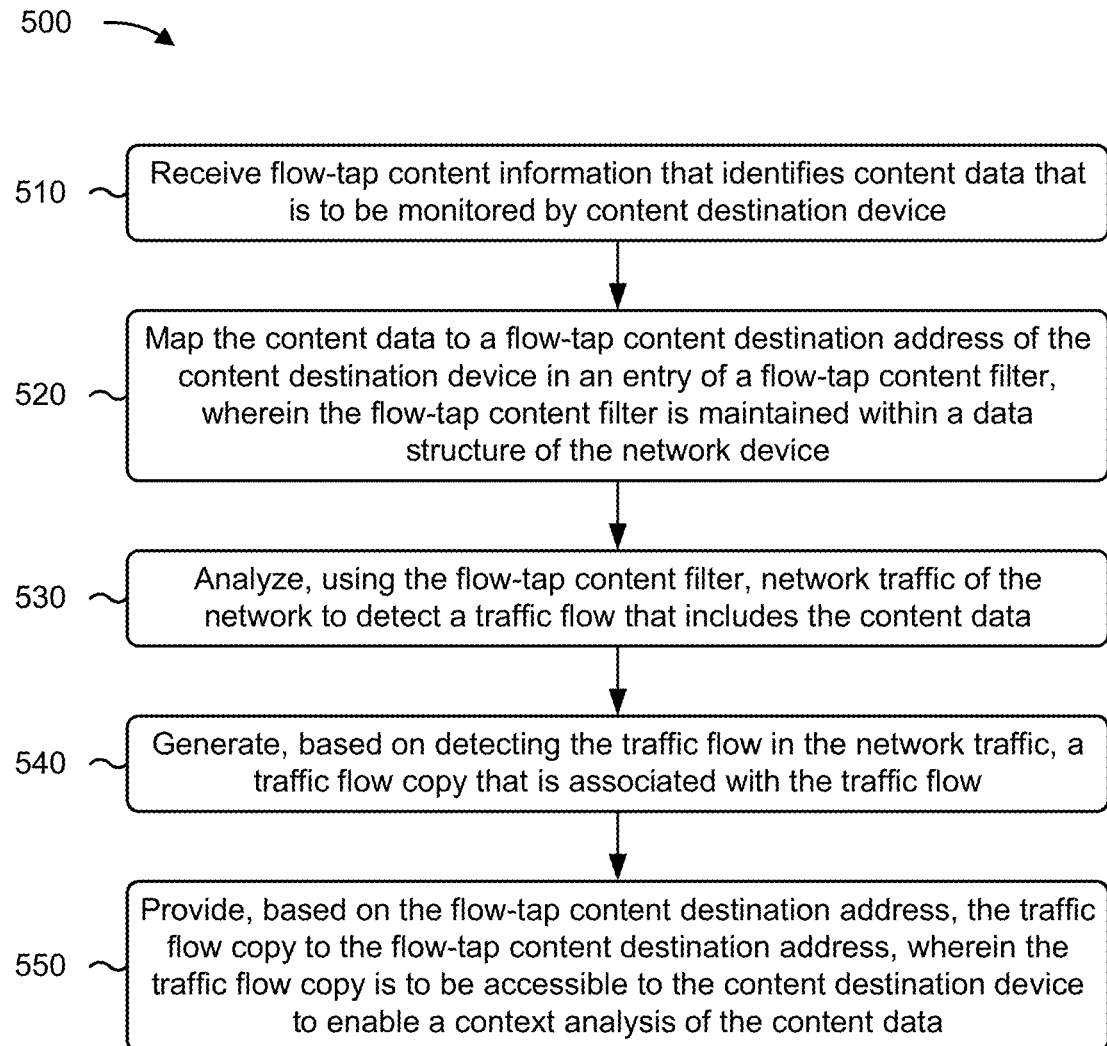
FIGS. 5-7 are flowcharts of example processes relating to network traffic monitoring based on content data.

FIG. 5 is a flowchart of an example process 500 associated with network traffic monitoring based on content data. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210), a content destination device (e.g., content destination device 240), a mediation device (e.g., mediation device 250), and/or the like.

As shown in FIG. 5, process 500 may include receiving flow-tap content information that identifies content data that is to be monitored by a content destination device (block 510). For example, the network device (e.g., using processor 320, memory 330, storage component 340, input component 350, output component 360, communication interface 370, input component 410, switching component 420, output component 430, controller 440, and/or the like) may receive flow-tap content information that identifies content data that is to be monitored by a content destination device, as described above.

As further shown in FIG. 5, process 500 may include mapping the content data to a flow-tap content destination address of the content destination device in an entry of a flow-tap content filter, wherein the flow-tap content filter is maintained within a data structure of the network device (block 520). For example, the network device (e.g., using processor 320, memory 330, storage component 340, input component 350, output component 360, communication interface 370, input component 410, switching component 420, output component 430, controller 440, and/or the like) may map the content data to a flow-tap content destination address of the content destination device in an entry of a flow-tap content filter, as described above. In some implementations, the flow-tap content filter is maintained within a data structure of the network device.

As further shown in FIG. 5, process 500 may include analyzing, using the flow-tap content filter, network traffic of the network to detect a traffic flow that includes the content data (block 530). For example, the network device (e.g., using processor 320, memory 330, storage component 340, input component 350, output component 360, communication interface 370, input component 410, switching component 420, output component 430, controller 440, and/or the like) may analyze, using the flow-tap content filter, network traffic of the network to detect a traffic flow that includes the content data, as described above.

As further shown in FIG. 5, process 500 may include generating, based on detecting the traffic flow in the network traffic, a traffic flow copy that is associated with the traffic flow (block 540). For example, the network device (e.g., using processor 320, memory 330, storage component 340, input component 350, output component 360, communication interface 370, input component 410, switching component 420, output component 430, controller 440, and/or the like) may generate, based on detecting the traffic flow in the network traffic, a traffic flow copy that is associated with the traffic flow, as described above.

As further shown in FIG. 5, process 500 may include providing, based on the flow-tap content destination address, the traffic flow copy to the flow-tap content destination address, wherein the traffic flow copy is to be accessible to the content destination device to enable a context analysis of the content data (block 550). For example, the network device (e.g., using processor 320, memory 330, storage component 340, input component 350, output component 360, communication interface 370, input component 410, switching component 420, output component 430, controller 440, and/or the like) may provide, based on the flow-tap content destination address, the traffic flow copy to the flow-tap content destination address, as described above. In some implementations, the traffic flow copy is to be accessible to the content destination device to enable a context analysis of the content data.

Process 500 may include additional implementations, such as any single implementation or any combination of implementations described below and/or in connection with one or more other processes described elsewhere herein.

In a first implementation, receiving the flow-tap content information comprises receiving the flow-tap content information from a mediation device, and verifying, based on an authentication process, that the mediation device is authorized to utilize the flow-tap content filter, wherein the network traffic is analyzed based on verifying that the mediation device is authorized to utilize the flow-tap content filter.

In a second implementation, alone or in combination with the first implementation, the content data is associated with a set of keywords or a set of key phrases that are configured to trigger the content destination device to perform the context analysis.

In a third implementation, alone or in combination with one or more of the first and second implementations, the flow-tap content information identifies destination information that is associated with a destination that is to receive the content data, wherein the traffic flow is detected based on identifying that the traffic flow is to be forwarded to the destination.

In a fourth implementation, alone or in combination with one or more of the first through third implementations, the flow-tap content information identifies source information that is associated with a source that is to provide the content data, wherein the traffic flow is detected based on identifying that the traffic flow is associated with the source.

In a fifth implementation, alone or in combination with one or more of the first through fourth implementations, providing the traffic flow copy of the traffic flow to the flow-tap content destination address comprises determining a protocol associated with the content destination device receiving the traffic flow copy, and providing, according to the protocol, the traffic flow copy to the flow-tap content destination address.

In a sixth implementation, alone or in combination with one or more of the first through fifth implementations, process 500 includes forwarding the traffic flow to a traffic flow destination that is identified in the traffic flow.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
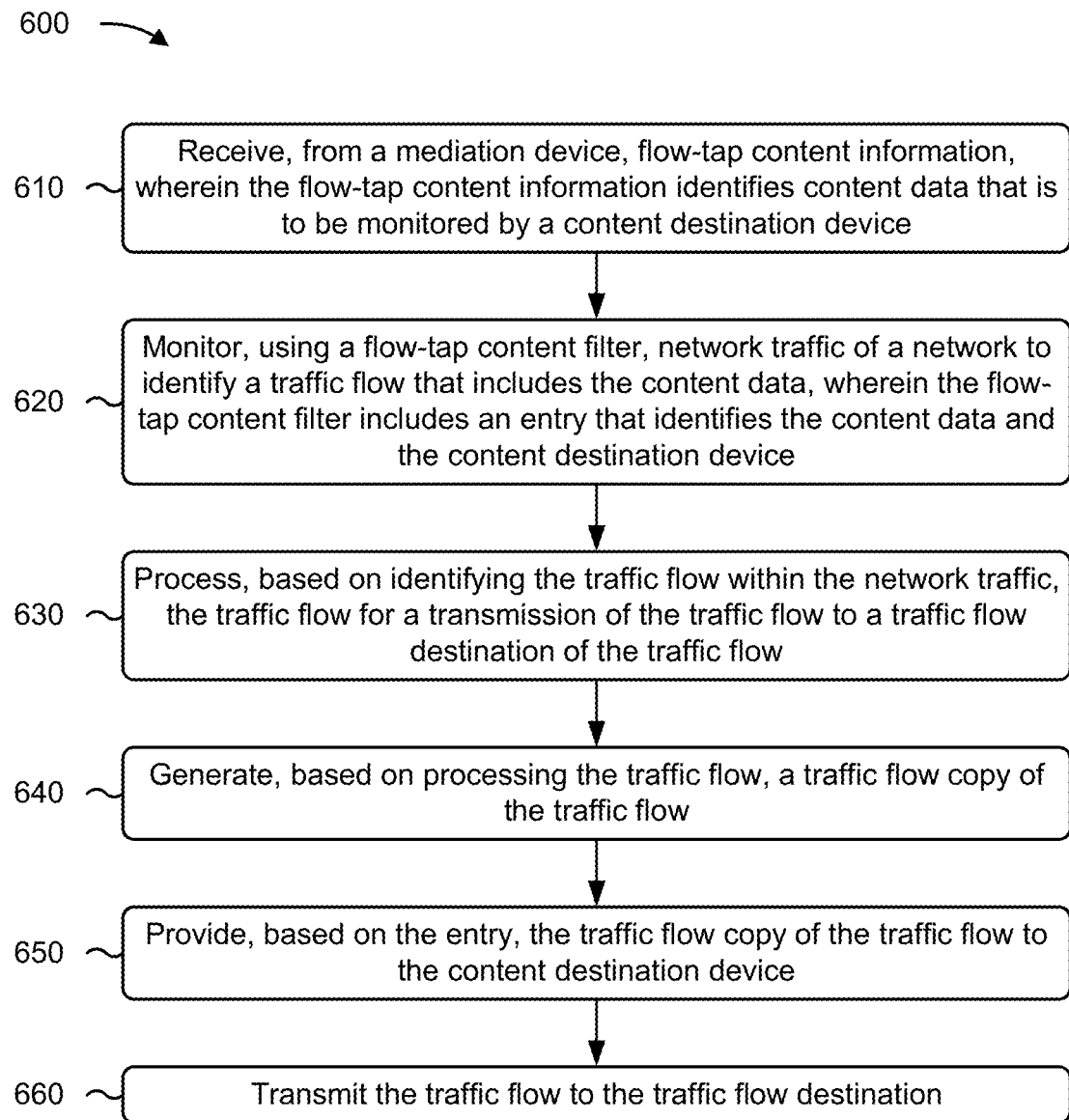

FIG. 6 is a flowchart of an example process 600 associated with network traffic monitoring based on content data. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210), a content destination device (e.g., content destination device 240), a mediation device (e.g., mediation device 250), and/or the like.

As shown in FIG. 6, process 600 may include receiving, from a mediation device, flow-tap content information, wherein the flow-tap content information identifies content data that is to be monitored by a content destination device (block 610). For example, the network device (e.g., using processor 320, memory 330, storage component 340, input component 350, output component 360, communication interface 370, input component 410, switching component 420, output component 430, controller 440, and/or the like) may receive, from a mediation device, flow-tap content information, as described above. In some implementations, the flow-tap content information identifies content data that is to be monitored by a content destination device.

As further shown in FIG. 6, process 600 may include monitoring, using a flow-tap content filter, network traffic of a network to identify a traffic flow that includes the content data, wherein the flow-tap content filter includes an entry that identifies the content data and the content destination device (block 620). For example, the network device (e.g., using processor 320, memory 330, storage component 340, input component 350, output component 360, communication interface 370, input component 410, switching component 420, output component 430, controller 440, and/or the like) may monitor, using a flow-tap content filter, network traffic of a network to identify a traffic flow that includes the content data, as described above. In some implementations, the flow-tap content filter includes an entry that identifies the content data and the content destination device.

As further shown in FIG. 6, process 600 may include processing, based on identifying the traffic flow within the network traffic, the traffic flow for a transmission of the traffic flow to a traffic flow destination of the traffic flow (block 630). For example, the network device (e.g., using processor 320, memory 330, storage component 340, input component 350, output component 360, communication interface 370, input component 410, switching component 420, output component 430, controller 440, and/or the like) may process, based on identifying the traffic flow within the network traffic, the traffic flow for a transmission of the traffic flow to a traffic flow destination of the traffic flow, as described above.

As further shown in FIG. 6, process 600 may include generating, based on processing the traffic flow, a traffic flow copy of the traffic flow (block 640). For example, the network device (e.g., using processor 320, memory 330, storage component 340, input component 350, output component 360, communication interface 370, input component 410, switching component 420, output component 430, controller 440, and/or the like) may generate, based on processing the traffic flow, a traffic flow copy of the traffic flow, as described above.

As further shown in FIG. 6, process 600 may include providing, based on the entry, the traffic flow copy of the traffic flow to the content destination device (block 650). For example, the network device (e.g., using processor 320, memory 330, storage component 340, input component 350, output component 360, communication interface 370, input component 410, switching component 420, output component 430, controller 440, and/or the like) may provide, based on the entry, the traffic flow copy of the traffic flow to the content destination device, as described above.

As further shown in FIG. 6, process 600 may include transmitting the traffic flow to the traffic flow destination (block 660). For example, the network device (e.g., using processor 320, memory 330, storage component 340, input component 350, output component 360, communication interface 370, input component 410, switching component 420, output component 430, controller 440, and/or the like) may transmit the traffic flow to the traffic flow destination, as described above.

Process 600 may include additional implementations, such as any single implementation or any combination of implementations described below and/or in connection with one or more other processes described elsewhere herein.

In a first implementation, process 600 includes, prior to monitoring the network traffic, verifying, based on credentials of the mediation device, that the mediation device is an authorized device, wherein the network traffic is monitored based on verifying that the mediation device is an authorized device.

In a second implementation, alone or in combination with the first implementation, process 600 includes, prior to monitoring the network traffic, identify, from the flow-tap content information, the traffic flow destination or a traffic flow source associated with the traffic flow, wherein the traffic flow is identified based on the traffic flow being associated with the at least one of the traffic flow destination or the traffic flow source.

In a third implementation, alone or in combination with one or more of the first and second implementations, processing the traffic flow includes extracting payload data of the traffic flow based on a structure of the traffic flow, wherein the traffic flow copy is generated to include the payload data, and wherein the content data is a subset of the payload data; and generating routing data for the transmission of the traffic flow to the traffic flow destination, wherein the traffic flow destination is associated with a destination address identified in the traffic flow.

In a fourth implementation, alone or in combination with one or more of the first through third implementations, the payload data is extracted from a set of traffic of the traffic flow and the set of traffic is associated with traffic that is received during a threshold time period after the content data is identified.

In a fifth implementation, alone or in combination with one or more of the first through fourth implementations, process 600 includes, prior to generating the traffic flow copy, notifying the content destination device that the traffic flow was identified based on the content data and receiving, from the content destination device, a tap authorization to provide the traffic flow copy, wherein the traffic flow copy is provided based on receiving the tap authorization.

In a sixth implementation, alone or in combination with one or more of the first through fifth implementations, executing the transmission includes providing the traffic flow to the traffic flow destination without notifying the traffic flow destination that the traffic flow copy was generated.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
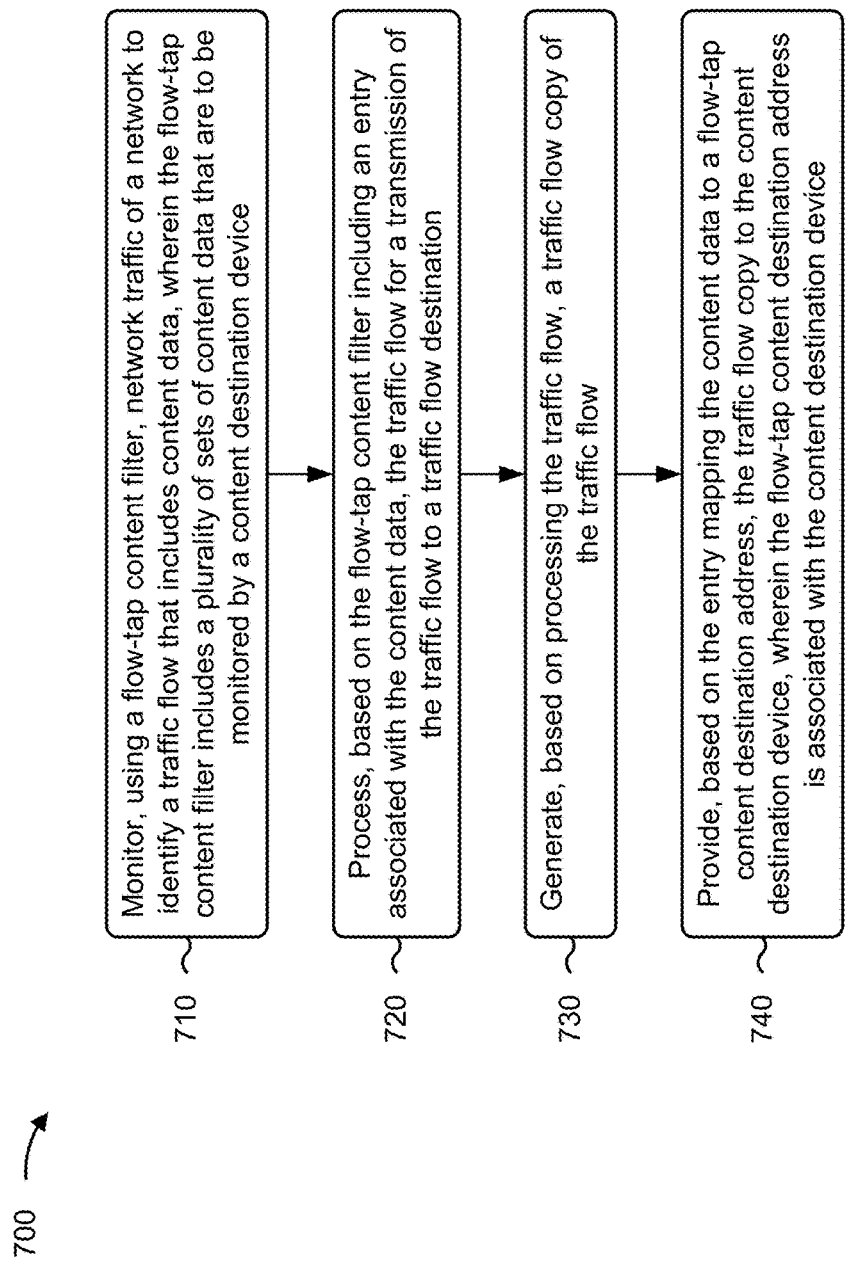

FIG. 7 is a flowchart of an example process 700 associated with network traffic monitoring based on content data. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210), a content destination device (e.g., content destination device 240), a mediation device (e.g., mediation device 250), and/or the like.

As shown in FIG. 7, process 700 may include monitoring, using a flow-tap content filter, network traffic of a network to identify a traffic flow that includes content data, wherein the flow-tap content filter includes a plurality of sets of content data that are to be monitored by a content destination device (block 710). For example, the network device (e.g., using processor 320, memory 330, storage component 340, input component 350, output component 360, communication interface 370, input component 410, switching component 420, output component 430, controller 440, and/or the like) may monitor, using a flow-tap content filter, network traffic of a network to identify a traffic flow that includes content data, as described above. In some implementations, the flow-tap content filter includes a plurality of sets of content data that are to be monitored by a content destination device.

As further shown in FIG. 7, process 700 may include processing, based on the flow-tap content filter including an entry associated with the content data, the traffic flow for a transmission of the traffic flow to a traffic flow destination (block 720). For example, the network device (e.g., using processor 320, memory 330, storage component 340, input component 350, output component 360, communication interface 370, input component 410, switching component 420, output component 430, controller 440, and/or the like) may process, based on the flow-tap content filter including an entry associated with the content data, the traffic flow for a transmission of the traffic flow to a traffic flow destination, as described above.

As further shown in FIG. 7, process 700 may include generating, based on processing the traffic flow, a traffic flow copy of the traffic flow (block 730). For example, the network device (e.g., using processor 320, memory 330, storage component 340, input component 350, output component 360, communication interface 370, input component 410, switching component 420, output component 430, controller 440, and/or the like) may generate, based on processing the traffic flow, a traffic flow copy of the traffic flow, as described above.

As further shown in FIG. 7, process 700 may include providing, based on the entry mapping the content data to a flow-tap content destination address, the traffic flow copy to the content destination device, wherein the flow-tap content destination address is associated with the content destination device (block 740). For example, the network device (e.g., using processor 320, memory 330, storage component 340, input component 350, output component 360, communication interface 370, input component 410, switching component 420, output component 430, controller 440, and/or the like) may provide, based on the entry mapping the content data to a flow-tap content destination address, the traffic flow copy to the content destination device, as described above. In some implementations, the flow-tap content destination address is associated with the content destination device.

Process 700 may include additional implementations, such as any single implementation or any combination of implementations described below and/or in connection with one or more other processes described elsewhere herein.

In a first implementation, the traffic flow is associated with at least one of a particular source, of the traffic flow, that is identified in the entry, or a particular destination, of the traffic flow, that is identified in the entry.

In a second implementation, alone or in combination with the first implementation, the content data is received within flow-tap content information from a mediation device, and process 700 includes generating, prior to monitoring the network traffic, the entry based on receiving the flow-tap content information from a mediation device.

In a third implementation, alone or in combination with one or more of the first and second implementations, the traffic flow is associated with a time period that follows a detection of the content data.

In a fourth implementation, alone or in combination with one or more of the first through third implementations, providing the traffic flow copy of the traffic flow to the content destination device includes configuring the traffic flow copy for the transmission to the flow-tap content destination address based on a communication protocol of the content destination device and providing the traffic flow copy to the content destination device according to the communication protocol of the content destination device.

In a fifth implementation, alone or in combination with one or more of the first through fourth implementations, process 700 includes transmitting the traffic flow to the traffic flow destination.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device of a network, flow-tap content information that identifies content data that is to be monitored by a content destination device;
   storing, by the network device, the flow-tap content information in a flow-tap content filter,
      wherein an entry of the flow-tap content filter identifies the content data;
   detecting, by the network device and using the flow-tap content filter, a traffic flow that includes a packet having the content data;
   sending, by the network device and to the content destination device, a message indicating that the traffic flow has been detected;
   extracting, by the network device, payload data of the traffic flow based on a structure of the traffic flow,
      wherein a traffic flow copy is generated to include the payload data, and
      wherein the content data is a subset of the payload data;
   generating, by the network device and based on receiving a response from the content destination device to perform a flow tapping process on the traffic flow, the traffic flow copy that corresponds to the traffic flow; and
   providing, by the network device, the traffic flow copy to the content destination device to permit the content destination device to perform a context analysis of the content data.

2. The method of claim 1, wherein receiving the flow-tap content information comprises:
   receiving, from a mediation device, credentials of the mediation device; and
   verifying, based on receiving the credentials of the mediation device, that the mediation device is authorized to utilize the flow-tap content filter.

3. The method of claim 1, wherein the content data is associated with a set of keywords or a set of key phrases that are configured to trigger the content destination device to perform the context analysis.

4. The method of claim 1, wherein the flow-tap content information further identifies:
   destination information that is associated with a destination that is to receive the content data,
      wherein the traffic flow is detected based on identifying that the traffic flow is to be forwarded to the destination.

5. The method of claim 1, wherein the flow-tap content information further identifies:
   source information that is associated with a source that is to provide the content data,
      wherein the traffic flow is detected based on identifying that the traffic flow is associated with the source.

6. The method of claim 1, further comprising:
   forwarding, and without indicating to a traffic flow destination that the traffic flow copy has been generated, the traffic flow to the traffic flow destination.

7. The method of claim 1, wherein the content destination device is associated with a law enforcement authority.

8. A network device, comprising:
   one or more memories; and
   one or more processors to:
      receive flow-tap content information that identifies content data that is to be monitored by a content destination device;
      store the flow-tap content information in a flow-tap content filter,
         wherein an entry of the flow-tap content filter identifies the content data;
      detect, using the flow-tap content filter, a traffic flow that includes a packet having the content data;
      send, to the content destination device, a message indicating that the traffic flow has been detected;
      extract payload data of the traffic flow based on a structure of the traffic flow,
         wherein a traffic flow copy is generated to include the payload data, and
         wherein the content data is a subset of the payload data;
      generate, based on receiving a response from the content destination device to perform a flow tapping process on the traffic flow, the traffic flow copy of the traffic flow;
      provide the traffic flow copy to the content destination device; and
      transmit the traffic flow to a traffic flow destination.

9. The network device of claim 8, wherein the flow-tap content information is received from a mediation device; and wherein the one or more processors, prior to detecting the traffic flow, are to:
verify, based on credentials of the mediation device, that the mediation device is an authorized device.

10. The network device of claim 8, wherein the one or more processors, prior to detecting the traffic flow, are to:
identify, from the flow-tap content information, the traffic flow destination or a traffic flow source associated with the traffic flow,
wherein the traffic flow is identified based on the traffic flow being associated with the at least one of the traffic flow destination or the traffic flow source.

11. The network device of claim 8, wherein the one or more processors, prior to generating the traffic flow copy, are to:
generate routing data for transmission of the traffic flow to the traffic flow destination,
wherein the traffic flow destination is associated with a destination address identified in the traffic flow.

12. The network device of claim 8, wherein the content data is associated with at least one of a set of keywords, a set of key phrases, or a set of word patterns that are configured to trigger the flow tapping process.

13. The network device of claim 8, wherein the one or more processors, when transmitting the traffic flow to the traffic flow destination, are to:
provide the traffic flow to the traffic flow destination without notifying the traffic flow destination that the traffic flow copy was generated.

14. The network device of claim 8, wherein the content destination device is associated with a law enforcement authority.

15. A non-transitory computer-readable medium storing instructions, the instructions comprising:
one or more instructions that, when executed by one or more processors of a network device, cause the one or more processors to:
receive flow-tap content information that identifies content data that is to be monitored by a content destination device;
store the flow-tap content information in a flow-tap content filter,
wherein an entry of the flow-tap content filter identifies the content data;
detect, using the flow-tap content filter, a traffic flow that includes a packet having the content data;
send, to the content destination device, a message indicating that the traffic flow has been detected;
extract payload data of the traffic flow based on a structure of the traffic flow,
wherein a traffic flow copy is generated to include the payload data, and
wherein the content data is a subset of the payload data; and
generate, based on receiving a response from the content destination device to perform a flow tapping process on the traffic flow, the traffic flow copy of the traffic flow; and
provide the traffic flow copy to the content destination device.

16. The non-transitory computer-readable medium of claim 15, wherein the traffic flow is associated with at least one of:
a particular source, of the traffic flow, that is identified in the entry, or
a particular destination, of the traffic flow, that is identified in the entry.

17. The non-transitory computer-readable medium of claim 15, wherein the one or more instructions, when executed by the one or more processors, further cause the one or more processors to:
transmit, without indicating to a traffic flow destination that the traffic flow copy was generated, the traffic flow to the traffic flow destination.

18. The non-transitory computer-readable medium of claim 15, wherein the flow-tap content information is received from a mediation device; and
wherein the one or more instructions, when executed by the one or more processors, further cause the one or more processors to:
verify, based on credentials of the mediation device, that the mediation device is an authorized device.

19. The non-transitory computer-readable medium of claim 15, wherein the content data is associated with at least one of a set of keywords, a set of key phrases, or a set of word patterns that are configured to trigger the flow tapping process.

20. The non-transitory computer-readable medium of claim 15, wherein the content destination device is associated with a law enforcement authority.

* * * * *